United States Patent
Chene

(10) Patent No.: US 6,225,892 B1
(45) Date of Patent: May 1, 2001

(54) GEAR FATIGUE MONITOR

(75) Inventor: George R. Chene, Sterling Heights, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/292,446

(22) Filed: Apr. 15, 1999

(51) Int. Cl.[7] ..................................................... B60Q 1/00
(52) U.S. Cl. ..................... 340/438; 340/441; 340/444; 340/454; 340/686.3
(58) Field of Search ..................................... 340/438, 441, 340/444, 454, 425.5, 679, 686.3

(56) References Cited

U.S. PATENT DOCUMENTS

| | | | |
|---|---|---|---|
| 4,269,070 | * | 5/1981 | Nelson et al. ........................... 73/779 |
| 4,499,450 | * | 2/1985 | Makita ................................ 340/52 R |
| 4,989,686 | * | 2/1991 | Miller et al. .......................... 180/197 |
| 5,067,354 | | 11/1991 | Kawai . |
| 5,133,696 | * | 7/1992 | Kobayashi .............................. 475/86 |
| 5,146,790 | | 9/1992 | Fish . |
| 5,329,465 | | 7/1994 | Arcella et al. . |
| 5,353,642 | | 10/1994 | Hasegawa et al. . |
| 5,524,034 | * | 6/1996 | Srygley et al. .......................... 377/15 |
| 6,040,768 | * | 3/2000 | Drexl ................................... 340/453 |

\* cited by examiner

Primary Examiner—Benjamin C. Lee
Assistant Examiner—Son Tang
(74) Attorney, Agent, or Firm—Carlson, Gaskey & Olds

(57) ABSTRACT

A system actively monitors the fatigue of gears used in a vehicle drive axle assembly. The system includes a sensor system for detecting a speed of rotation and a torque. The speed of rotation and the torque are indicative of the speed of rotation and the torque on the gears. A microprocessor communicates with the sensor system to gather the speed of rotation and torque information. The microprocessor utilizes the information to actively determine gear fatigue. The microprocessor compares the gear fatigue with a pre-selected threshold gear wear value. If the pre-selected threshold value has been exceeded, the microprocessor provides an output, which preferably notifies the driver of the excessive gear fatigue.

18 Claims, 2 Drawing Sheets

GEAR FATIGUE MONITOR

BACKGROUND OF THE INVENTION

This invention generally relates to a system for actively monitoring gear fatigue in a vehicle driveshaft while the vehicle is being driven.

Heavy vehicles, such as those operated in off-road environments, include a number of gears in the axle housing and planetary wheel ends (pinion, ring, planet and sun gears). Every rotation in combination with torque produces stresses on the gear teeth. These stress cycles cause the gears to fatigue. Gear combinations are selected for applications based on "typical" vehicle operation for the environment in which it will operate. The combination of driveshaft torque and driveshaft speed can be used to actively monitor gear stress and resulting fatigue caused by unexpected as well as "typical" vehicle operation.

Historically, gear fatigue has been estimated based on representative input factors. In other words, the gear life has been estimated based on expected vehicle operation. These representative values have been obtained from a combination of historical data, customer supplied usage criteria and empirical data.

The input factors used to determine the gear fatigue are the speed of rotation of the gear and the torque applied to the gear. These values are preferably used in combination with an algorithm to monitor unexpected torque/speed combinations as well as expected combinations that may impact the estimated fatigue performance of the gears. However, these calculations are not performed on-board during operation of the vehicle and thus are not representative of the cited gear damage.

It is important to note that many factors influence the fatigue performance of gears. Some factors include, but are not limited to, driver experience, driver abuse and operating environment, such as payloads and terrain. Using prior art representative samples, the gear performance in a particular application could fall short of expectations. Unexpected gear fatigue could cause unplanned operation down time and costly repairs. Alternatively, continuously monitoring the gear input factors could potentially prevent fatigue fracture and avoid unscheduled down time and costly repairs. Therefore, it is advantageous to monitor those factors that determine gear fatigue based on that vehicle's distinctive use history. Monitoring the gear performance optimizes the vehicle operation by decreasing down time and reducing unscheduled maintenance costs.

It is preferable to monitor gear fatigue so that a gear can be serviced or replaced at the time gear fatigue actually exceeds a threshold value. Consequentially, this proactive maintenance optimizes the performance of the vehicle and reduces maintenance costs in the long run. Gears will be serviced or replaced when they actually are in need.

Prior to this invention, there was no system available to actively determine the gear fatigue of a vehicle while the vehicle was in operation. This invention allows for a more accurate gear fatigue determination for each individual vehicle by continuously monitoring the input factors.

SUMMARY OF THE INVENTION

In general terms, this invention discloses a system for monitoring gear fatigue cycles in drive axles in a vehicle during vehicle operation. The system includes 1) a rotating shaft in a vehicle driveshaft, 2) at least one gear driven by the rotating shaft, 3) a sensor system that detects rotation speed and torque indicative of the speed and torque on the gear, and 4) a microprocessor in the vehicle. The microprocessor communicates with the sensor system to actively determine the gear stresses as the vehicle is being driven.

In a preferred embodiment, the gear stresses are determined based on calculations using the speed of rotation and the driveshaft torque. The speed of rotation and the torque of the driveshaft are indicative of the speed of rotation and torque of the gears. Once the detected gear fatigue exceeds a pre-selected threshold value the system preferably responds in one of two alternative manners. First, a signal may be provided to the driver of the vehicle indicating that the gear fatigue has exceeded a pre-selected value. Second, the information regarding the torque and speed combinations may be stored so that a service technician can later access it.

DETAILED DESCRIPTION OF THE PREFERRED EMBODIMENT

Figure 1:
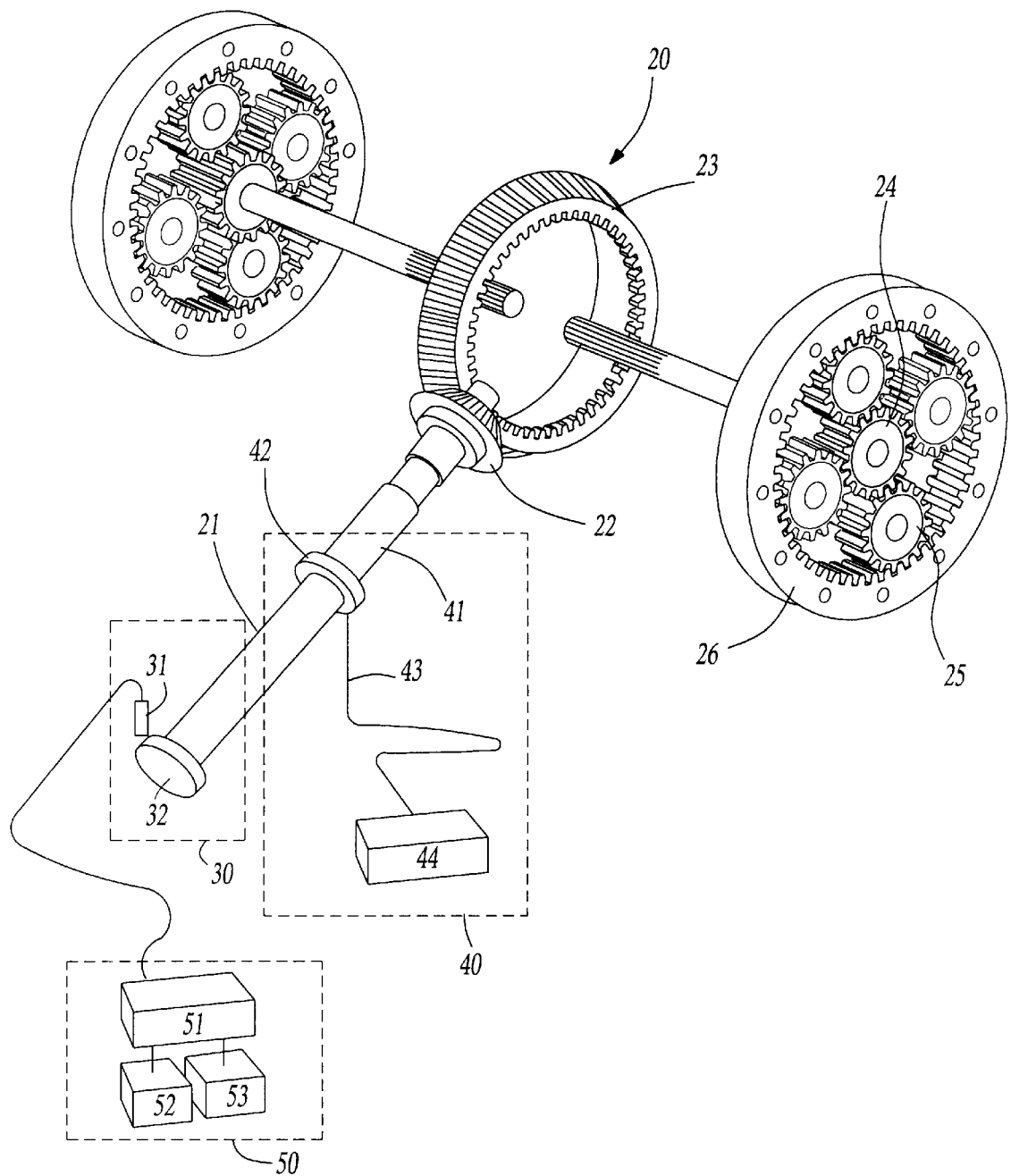
FIG. 1 is a schematic illustration of a system designed according to this invention.

FIG. 1 schematically illustrates a system 20 for monitoring the fatigue of the pinion gear 22, ring gear 23, planetary wheel end sun gear 24, planetary wheel end planet gears 25, and planetary wheel end ring gear 26 which make up the carrier and planetary wheel ends of a vehicle. While only one axle is shown, a vehicle may include another similar assembly or simply an axle with a pinion and ring gear. It should be understood that all of the gears in the axle assemblies could be monitored with this system. Preferably, the sensor system is comprised of two sensors 30, 40. The first sensor system 30 detects the speed of rotation of the driveshaft 21. The second sensor system 40 detects the torque of the driveshaft 21. The detected speed of rotation and the detected torque are indicative of the speed of rotation and torque of the gears 22–26. The system also includes a microprocessor system 50 contained within the vehicle that communicates with the sensor systems 30, 40 to actively determine the gear fatigue as the vehicle is being driven.

The microprocessor system 50 utilizes the information from the first and second sensor systems 30, 40 to actively determine fatigue on the pinion gear 22, ring gear 23, planetary wheel end sun gear 24, planetary wheel end planet gears 25, and planetary wheel end ring gear 26. The microprocessor system 50 determines whether the detected gear fatigue exceeds a pre-selected threshold value. The pre-selected threshold value preferably includes an acceptable range of gear fatigue.

If detected gear fatigue exceeds pre-selected threshold values, the microprocessor system 50 also preferably provides an output. The microprocessor 51 output preferably either immediately provides signals to the vehicle operator, such as at display 52, identifying which gear may be near its fatigue limit. Alternatively, or in addition, microprocessor 51 may store the information in memory 53 for accessibility by a service technician. The notification to the driver preferably prompts the driver to inspect and possibly replace the suspect gear.

In a preferred embodiment, speed sensor system 30 is comprised of a tone wheel 32 fixed to driveshaft 21 and a speed pickup sensor 31 to transmit the speed signal to the microprocessor system 50. In an alternative embodiment, the speed signal may be a pulse signal provided by the transmission controller.

In the preferred embodiment, the torque sensor system 40 is comprised of four strain gauges 41 mounted on the driveshaft 21 in a wheatstone bridge configuration in a manner that will provide a voltage proportional to the torque of the driveshaft 21. The output from the gauges 41 is transmitted to the signal processor 44 via transmitter 42 and antenna 43. In an alternative embodiment, the torque value may be taken from torque/speed information provided by the engine manufacturer.

Figure 2:
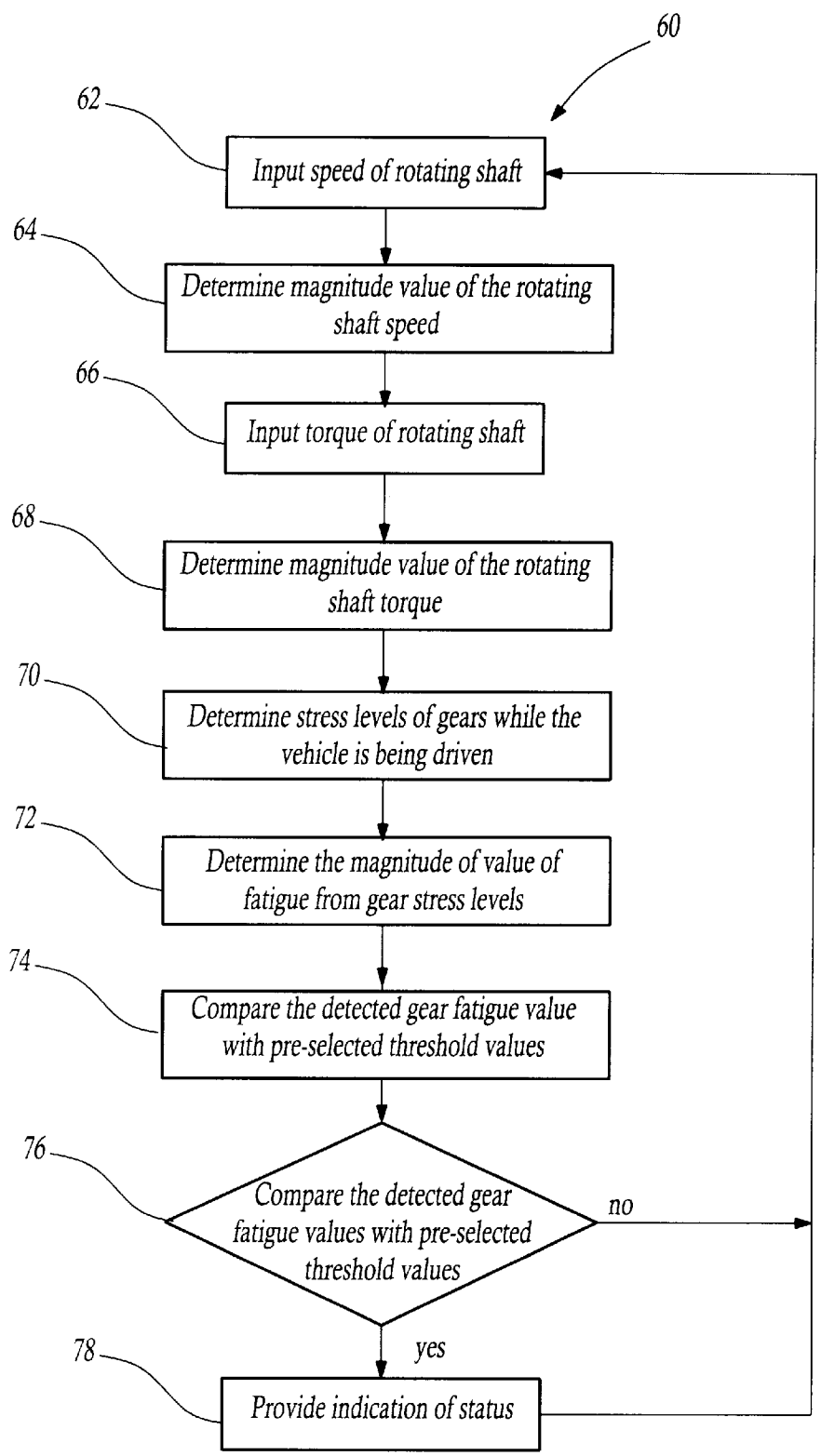
FIG. 2 is a flowchart diagram illustrating the preferred method of this invention.

FIG. 2 schematically illustrates a preferred method of operating the system 20. The flow chart 60 includes a first step at 62 where a sensor detects the speed of rotation of the rotating shaft 21 and sends the information to the microprocessor 51. The microprocessor 51 determines the magnitude value of the rotating shaft 21 speed at 64. Next, the second sensor system 40 detects the torque on the rotating shaft at 66. The microprocessor 51 determines the magnitude value of the torque on the rotating shaft 21 at 68. At 70 the microprocessor 51 utilizes the magnitude values of the speed of rotation and the torque of the rotating shaft 21 to actively determine the fatigue of the gears 22-26 while the vehicle is being driven. Next, at 72, the microprocessor determines a magnitude value of the gear fatigue. Then, the microprocessor 51 compares the detected gear fatigue value with the preselected threshold value at 74.

The microprocessor is programmed to have access to information developed experimentally from a particular test group of vehicles, similar to the vehicle incorporating the system 20. The accessed information may be in the form of archives, an algorithm, or other types of data. Information can be gathered that correlates gear fatigue to particular speed and torque combinations. Thus, certain weights are assigned to periods of high speed/high torque and other weights to periods of low speed/low torque, etc. The method for developing the weighting factors for each of the speed/torque combinations is well within the skill in this art. Once the factors are developed experimentally, the microprocessor can then apply them to the actual history of the particular vehicle incorporating the system.

The microprocessor monitors actual vehicle conditions and keeps a running total of predicted gear life based on the monitored condition. The technology to achieve this prediction is within the skill of a worker in the microprocessor art. It is the application to real time monitoring which is novel. The microprocessor preferably stores a predetermined gear fatigue level, again determined through experimental development on a test group of vehicles. This level can be utilized as a threshold. A decision is made at 76 if the detected gear fatigue value exceeds the pre-selected threshold value. If the detected gear wear value does exceed pre-selected threshold then, an output is provided at 78. As can be appreciate from the flow chart 60, the system 20 preferably continuously monitors the gear wear Given this description, those skilled in the art will be able to program a conventional microprocessor to perform the functions of the microprocessor 51.

The invention has been described in an illustrative manner, and it is to be understood that the terminology that has been used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. A system for monitoring fatigue of axle gears in a vehicle comprising:

a rotating shaft in a vehicle driveline;

at least one gear driven by said rotating shaft in the vehicle driveline;

a sensor system that detects a speed of rotation and detects a torque;

a microprocessor in the vehicle that communicates with said sensor system to actively determine the gear fatigue as the vehicle is being driven; and the detected speed and the detected torque are indicative of speed and torque on said at least one gear, said sensor system including a first sensor device to detect the speed of rotation and a second sensor device that detects the torque, and said second sensor device comprising at least one strain gauge mounted on said shaft.

2. The system of claim 1, wherein said microprocessor determines whether the detected gear fatigue exceeds a pre-selected threshold value.

3. The system of claim 2, wherein said microprocessor provides an output when the threshold value has been exceeded.

4. The system of claim 3, wherein the microprocessor output includes an indication to the vehicle operator that the pre-selected threshold value has been exceeded.

5. The system of claim 3, wherein the microprocessor includes a memory module that stores the output history and includes an indication that is accessible by a service technician that the pre-selected threshold value has been exceeded.

6. The system of claim 1, wherein said first sensor device communicates with an electronic engine control module and said electronic engine control module communicates with said microprocessor.

7. The system of claim 1, wherein said second sensor device comprises strain gauges in a Whetstone Bridge configuration and said sensors are mounted to said shaft.

8. The system of claim 1, wherein said second sensor device utilizes a radio signal to transmit the detected torque value to said microprocessor.

9. The system of claim 1, wherein said microprocessor accesses gear fatigue data gathered from other vehicles.

10. A vehicle drive system comprising:

at least one axle gear;

a rotating driveshaft connected to said at least one axle gear;

a first sensor device to detect the speed of rotation of said shaft which is indicative of the speed of rotation of said at least one gear;

a second sensor device comprising four strain gauges mounted on said shaft to detect the torque on said shaft which is indicative of the torque on said at least one gear; and a microprocessor in the vehicle that communicates with said first sensor and said second sensor and utilizes the information from said first sensor and said second sensor to determine a gear fatigue value as the vehicle is being driven, said microprocessor applying the information from the actual use of the vehicle to a program developed by testing at least one other vehicle to develop factors to apply to the speed and torque of the particular vehicle.

11. The system of claim 10, wherein said microprocessor determines when the gear fatigue value exceeds a preselected threshold value and said microprocessor provides an output when the threshold value has been exceeded.

12. The system of claim 11, wherein the microprocessor output includes an indication to the vehicle operator that the pre-selected threshold value has been exceeded.

13. The system of claim 11, wherein said microprocessor includes a memory module that stores the output and includes an indication that is accessible by a service technician that the pre-selected threshold value has been exceeded.

14. The system of claim 10, wherein said second sensor utilizes a radio signal to transmit the detected torque value to said microprocessor.

15. The system of claim 10, wherein said gear has gear teeth engaged with gear teeth of another gear to rotate with said other gear.

16. A method of detecting fatigue of a gear on a rotating shaft in a vehicle driveline, comprising the steps of:

(A.) detecting a speed of rotation of the shaft during operation of the vehicle which is indicative of the speed of rotation of the gear;

(B.) determining a magnitude value of the speed of rotation of the shaft;

(C.) detecting a torque on the shaft during operation of the vehicle which is indicative of the torque on the gear;

(D.) determining a magnitude value of the torque on the shaft;

(E.) determining the fatigue of the gear while the vehicle is being driven by utilizing the values from step (B) and step (D);

(F.) determining a magnitude value of the gear fatigue; and (G.) determining whether the value from step (F) exceeds a predetermined threshold value.

17. The method of claim 16, further comprising developing factors for weighting particular speed and torque combinations experimentally on at least one other vehicle, and utilizing said factors in step (E) to determine gear fatigue on the subject vehicle.

18. A method as set forth in claim 16, wherein said gear has gear teeth engaged with another gear to rotate with said other gear.

* * * * *